Jan. 20, 1959  V. A. HOOVER  2,869,386
ADJUSTABLE END FITTING FOR MECHANICAL ACTUATOR
Original Filed April 4, 1953  2 Sheets—Sheet 1
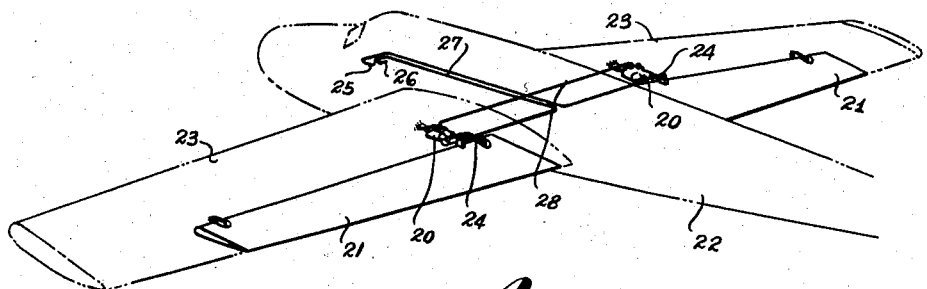
Fig. 1
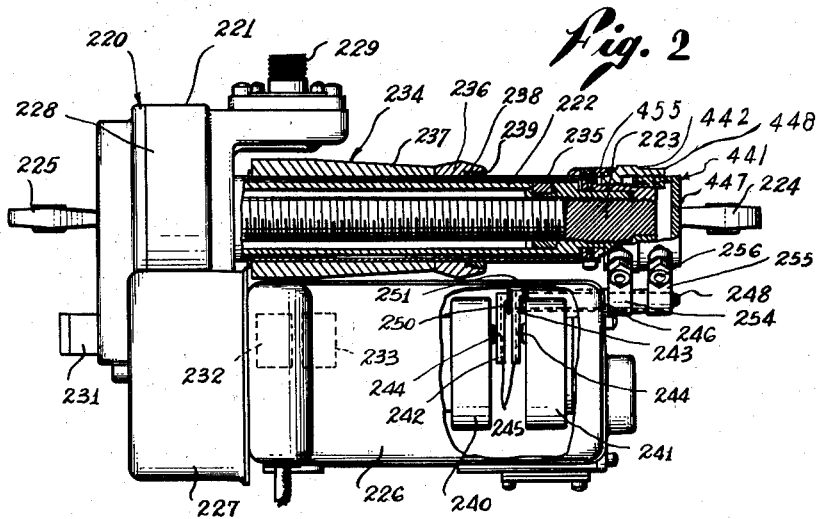
Fig. 2
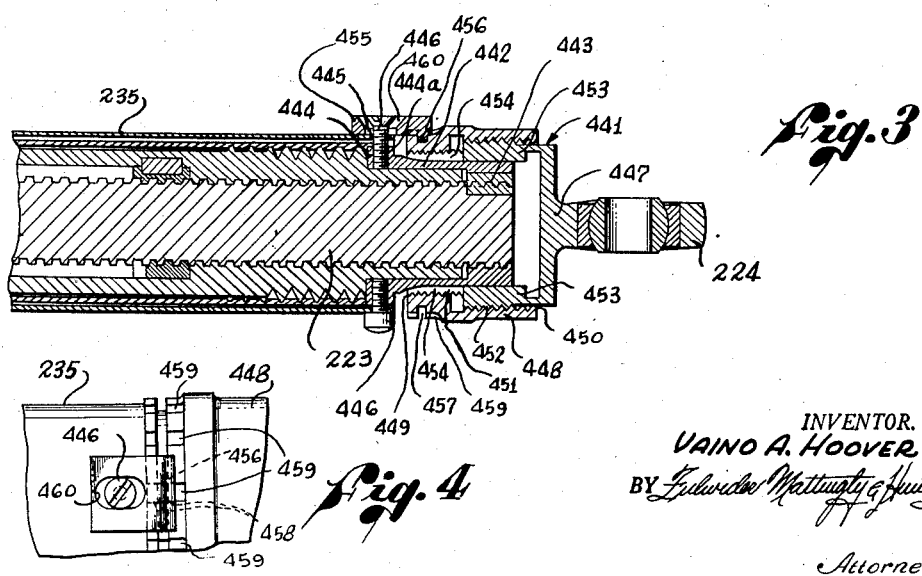
Fig. 3
Fig. 4
INVENTOR.
VAINO A. HOOVER
BY
Attorneys

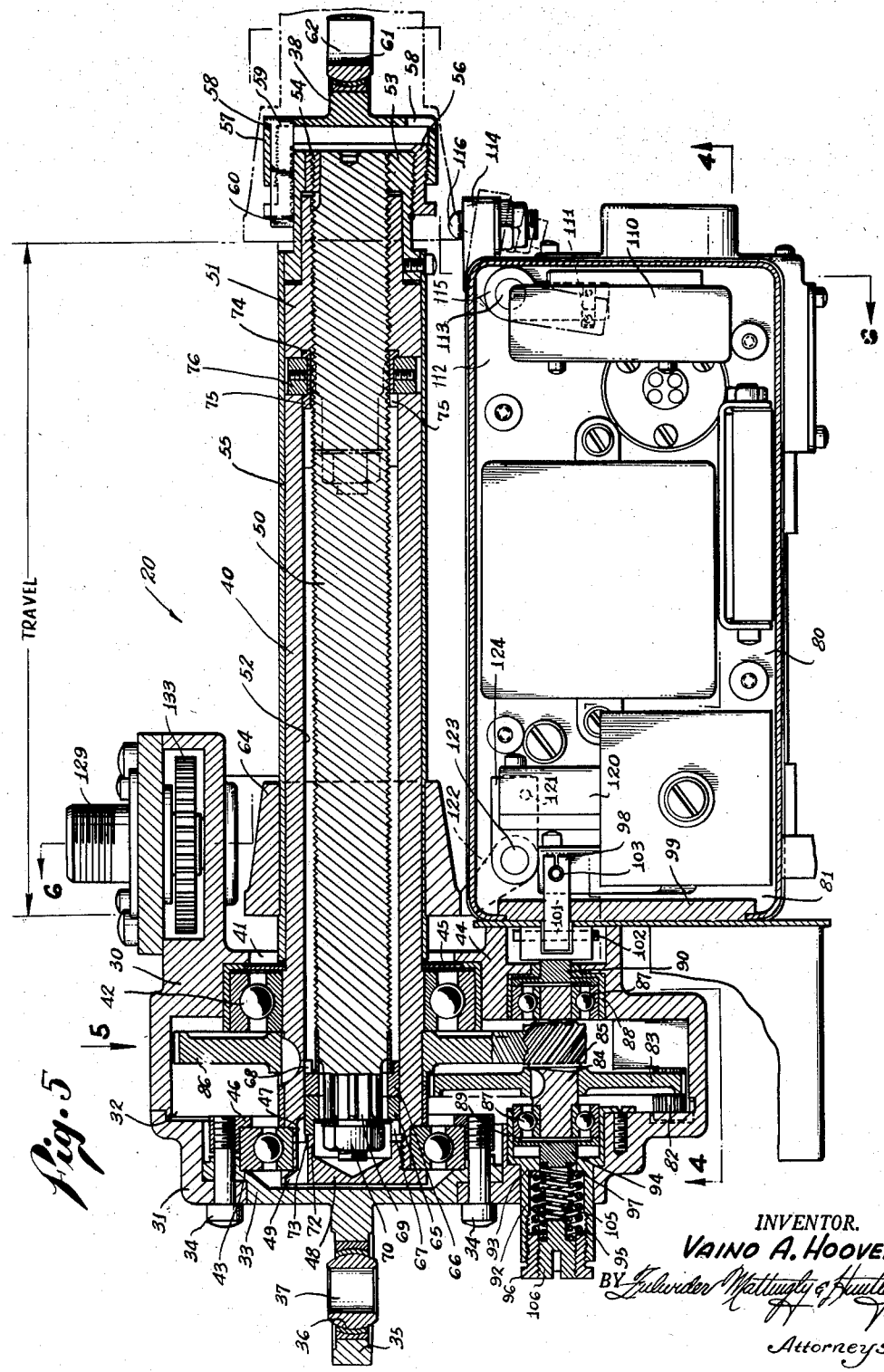

United States Patent Office 2,869,386
Patented Jan. 20, 1959

2,869,386

ADJUSTABLE END FITTING FOR MECHANICAL ACTUATOR

Vaino A. Hoover, Los Angeles, Calif.

Original application April 4, 1953, Serial No. 348,741. Divided and this application August 12, 1957, Serial No. 677,679

3 Claims. (Cl. 74—424.8)

This application is a division based on my copending application Serial No. 348,741, filed April 4, 1953, and entitled Mechanical Actuator, and relates particularly to an end fitting capable of adjusting the length of such an actuator to fit it to the driven device.

Mechanical actuators described in my above-mentioned copending application are of the same general type as those described in my Patent No. 2,590,251 issued March 25, 1952, entitled Mechanical Actuator. This type of actuator uses an electric motor to rotate one member of a cooperating nut and screw assembly, for providing relative longitudinal movement. The actuator can develop a relatively great linear thrust force, and is very advantageous for use in the remote positioning of various devices since it may be connected to the control station by simple electrical circuits. Because of their compact size and light weight, such actuators are used frequently in aircraft for the remote positioning of control surfaces, canopies, doors, and the like, which are controlled from the cockpit of the plane.

To facilitate attachment of the actuator to the driven device, mounting members or ears are provided. These ears move longitudinally with respect to each other when the actuator is operated.

In many installations it is important that the mounting members or ears of the actuator be capable of some degree of adjustment with respect to each other in addition to that caused by operation of the actuator.

For example, in the operation of wing flaps it is important that the flaps be precisely positioned in their retracted position. Since the actuators herein referred to have positive mechanical stops at their limits it is essential that the distance between the ears of each actuator, when it is positioned in engagement with its retract mechanical stops, correspond exactly to the distance necessary to dispose the wing flaps in their fully retracted position.

It is therefore a major object of this invention to provide, in a mechanical actuator of the type described, means for quickly and easily adjusting the spacing between the actuator ears for any particular position of the actuator.

It is another object of my invention to provide means for adjusting the distance between actuator ears which may be operated without disconnecting the actuator from the driven device.

A further object of my invention is to provide ear adjusting means of the type described which may be adjusted to change the linear spacing between the ears without changing the rotational position of the ears.

Still another object of my invention is to provide ear adjusting means for a mechanical actuator which is inexpensive to construct and simple to operate.

These and other objects and advantages of the invention will become apparent from the following detailed description of preferred and modified forms thereof, and from an inspection of the accompanying drawings, in which:

Figure 1 is a schematic view of an airplane showing a pair of wing flap actuators installed therein;

Figure 2 is a partial longitudinal medial section through a preferred form of mechanical actuator;

Figure 3 is an enlarged view of the adjustable end fitting shown in Figure 2;

Figure 4 is a plan view of the end fitting of Figure 3; and

Figure 5 is an enlarged, sectional, elevational view of an actuator having a second embodiment of my adjustable end fitting.

Referring now to the drawings, and particularly to Figure 1 thereof, mechanical actuators 20 are shown installed for moving wing flaps 21 of a typical aircraft 22. The flaps 21 are movable pivotally from a normal retracted position in which they are aligned with the trailing edges of the wings 23, to a downwardly-inclined, extended position. The actuators 20 are mounted in the structure of wings 23 and connected, one to each of the flaps, by suitable linkages 24. The arrangement is such that linear extension of each actuator 20 will cause downward movement of the connected flap 21, and retraction of the actuator brings the flaps upwardly to their normal, retracted position.

Mounted in the cockpit of the airplane 22, or at other suitable control station, are normally open "extend" and "retract" control switches 25 and 26, respectively, which are interconnected with both of the actuators 20 by an electrical control circuit 27. Upon closing of the "extend" switch 25, both of the flaps 21 are simultaneously lowered, and upon closing of "retract" switch 26 both of the flaps are simultaneously retracted.

As best shown in Figure 2, the actuators 20 are of the same general type as disclosed in my copending application and patent referred to above. In general, each actuator 20 has a housing 221 in which is mounted a rotatable and axially immovable elongated nut 222. Engaged within nut 222 is an axially movable and non-rotatable screw 223 carrying on its outer end an attaching ear 224 which is linearly movable with respect to an opposite ear 225 secured to housing 221. The means for driving nut 222 are the same as those described in my above-mentioned copending application, and include a motor 226 driving through a magnetic clutch and brake unit 227 to a reduction gear drive 228, which is in turn connected to the driving nut.

At the top of housing 221 are a pair of coupling receptacles 229 which have therein driving pinions adapted for connection with a flexible shaft to mechanically interconnect the driving nuts 222 of a pair of actuators in the manner described in my copending application referred to herein. Mechanical limit stops similar to those mentioned in my copending application are also provided, and means for insuring full retraction of screw 223 against the inner stop including a load-limiting mechanism 231 connected to a load limit switch 232. A load limit shorting switch 233 is connected across switch 232 so as to render the latter ineffective to de-energize motor 228. Shorting switch 233 has an actuating lever (not shown) which is positioned so as to be moved in a direction to open the electrical contacts of switch 233 when screw 223 has approached the inner limit of its travel. Thus load limit switch 232 is effective only when the inner mechanical stops are about to engage. As can be appreciated, the device thus far described has the same construction as the actuator in my copending application Serial No. 348,741, and it is not necessary to repeat the details of operation thereof.

Mounted on the motor 226 is an "intermediate" limit switch 240 and an "extend" limit switch 241 that are normally closed in the motor circuit, and adapted to be opened by the cam means 234. When "intermediate"

limit switch 240 is opened, screw 223 is stopped accurately at an intermediate position determined by the longitudinal adjustment of collar 236 with respect to tube 235, and when the "extend" switch 241 is opened the screw is stopped in a fully extended position.

To operate switches 240 and 241 I provide actuating arms 242 and 243, respectively, which are pivotally mounted adjacent switch plungers 244 and extend outwardly from the adjacent sides of the switches. Upon inward depression of plungers 244, electrical contacts within the switches are moved from a closed to an open position.

The operation of the actuators 20 is as follows: Starting with the wing flaps 21 in their fully retracted position, the flaps are extended by closing the "extend" control switch 25 or an "intermediate" control switch which would be provided with actuators also capable of stopping at an intermediate position as in the above-described embodiment. This energizes the motors 226 of the actuators in the proper direction to drive the screw 223 outwardly until either the "intermediate" limit switch 240 or the "extend" limit switch 241 are opened by engagement of one of the actuating arms 242 and 243 with the cam means 234. This de-energizes the motors 226 and stops the actuators.

To retract the wing flaps 21 the "retract" control switch 25 is closed to energize the actuator motors 226 in the other direction to drive the screw 223 inwardly. Because it is important to proper operation of the aircraft that the flaps 21 be accurately aligned with the trailing edges of the wings in their retract position, the actuators 20 are driven into their retract mechanical stops before the motors 226 are de-energized. This is made possible by utilization of the load-limiting mechanisms 231 and their associated load limit switches 232. When the actuators have retracted sufficiently to engage their mechanical stops, the load-limiting mechanisms sense the excess load and cause the load limit switches 232 to open. This de-energizes the motors 226 leaving the actuators in their retract position mechanical stops. As explained above, if the distance between the actuator ears is properly adjusted to the linkages 24, this accurate positioning of the actuators assures that the flaps are accurately aligned with the wings.

To assure proper adjustment of the actuator ears to the linkage 24, the actuators are provided with an adjustable end fitting 441. The end fitting 441 has a sleeve 442 which threadedly engages the screw 223 at its outer end and is keyed thereto by a key 443. The sleeve 442 has an annular shoulder 444 at its inner end with tapped radial holes 444a which are aligned with radial holes 445 through the outer end of tube 235. Holding screws 446 pass through the holes 445 and thread into the holes 444 thereby securing the tube 235 to the sleeve 442.

The ear 224 is formed as an integral part of a head 447 which is adjustably connected to the sleeve 442 by a nut 448. The nut 448 has a bore of lesser diameter 449 at its inner end and a bore of greater diameter 450 at its outer end. Both of the bores 449 and 450 are threaded; however, the threads in the bore of lesser diameter 449 are right-hand threads while those in the bore of greater diameter 450 are left-hand threads. The threads also have different leads.

The sleeve 442 has external threads 451 which extend from the shoulder 444 to the sleeve's outer end and are identical to and in engagement with the threads of the lesser diameter bore 449. The head 447 has external threads 452 which match and engage the threads of the greater diameter bore 450. The nut 448 therefore threadedly connects the head 447 to the sleeve 442.

To prevent the head 447 from turning with respect to the sleeve 442, the head 447 has a bore at its inner end with axially directed, radial protrusions 453 therein. These protrusions 453 fit into axially directed keyways 454 formed in the outer portion of the sleeve 442, thereby preventing relative rotation between the sleeve and the head even under high torque conditions.

To adjust the length of the end fitting 441 to vary the distance between the actuator's ear 224 and 225, nut 448 is rotated. Because nut 448 is threadedly engaged with both the sleeve 442 and the head 447 and these latter members are fixed against relative rotation, rotating the nut in a clockwise direction, as viewed from the end having ear 224 in Figure 3, will tighten the nut onto the right-hand threads of sleeve 442 and, at the same time, will also tighten the nut onto the left-hand threads of head 447. Since the threads 451 and 452 have different leads they will shorten the end fitting by different amounts but the resultant overall shortening will be the sum of their individual contributions.

To keep the nut 448 from rotating after the end fitting has been adjusted, a locking device 455 is provided. The locking device 455 is held on the tube 235 by the holding screws 446 and has a lug 456 which projects radially into an annular groove 457 in the periphery of the nut 448 and an axially directed protrusion 458 which extends on either side of the lug 456 and engages one of a plurality of axially directed slots 459 disposed across the annular groove. When secured by the holding screw 446 the locking device 455 prevents rotation of nut 448 because the projection 458 is held in one of the slots 459. The locking device is prevented from rotating about the axis of the holding screw 446 by the lug 456 which engages the annular groove 457. The locking device is not required to sustain any of the operating load on the actuator since the torque is transmitted from screw 223 to the ear 224 through the engagement of projections 453 with the keyways 454 and the thrust is transmitted by the threads 451 and 452.

Because the lug 456 is carried in annular groove 457, the locking device 455 must be capable of moving axially along with nut 448. To permit this, the hole 460 which receives the holding screw 446 is elongated in an axial direction an amount sufficient to allow some axial movement of nut 448 but not so much that the thrust transmitting threads 451 and 452 too closely approach their point of disengagement.

Another embodiment of my invention is shown in Figure 4. In this embodiment the actuator is substantially the same as that in the first embodiment but has only "retract" and "extend" positions and no "intermediate" position.

The adjustable end fitting 52a of this embodiment has a sleeve 53 which is threadedly engaged with the outer end of the actuator screw 50 and is locked against rotation with respect to the screw by a key 54. The inner end of the sleeve 53 is secured by a radial holding screw to a thin-walled tubular cover 55 which slidably covers the nut 40 of the actuator. The outer end portion of the sleeve 53 is externally threaded to take an adjustment nut 56 which in turn carries a head 57. Formed integrally with the outer end of head 57 is an ear 38.

The head 57 is threadedly engaged on nut 56 by threads of the same direction (right-hand) but having a different lead than those between the nut and sleeve 53. Thus, rotating the nut 56 in a clockwise direction, as viewed from the end having ear 38, will tighten the nut onto sleeve 53 tending to shorten the fitting but, at the same time, will loosen the nut on the head 57, tending to lengthen the fitting. The overall change in the length of the fitting will therefore be the difference between the individual contributions of each thread. This provides a vernier adjustment of the head 57 with respect to the screw 50 which will be quite accurate when the difference in lead between the threads is small. The end wall of head 57 has diametrically opposed slots 58 disposed therein which are adapted to receive a key 59 for locking it relative to nut 56. A locking wire 60 may be passed through key 59 to prevent any change in its adjustment, once set.

The end fitting of this embodiment is adjustable in substantially the same manner as in my first-mentioned embodiment. That is, by rotating the nut 56. This causes a change in the overall length of the fitting because of the difference in lead between the threads of nut 56 which are in engagement with the sleeve 53 and the threads which are in engagement with the head 57. In this embodiment, however, external means such as a tool or linkage attached to gear 38 must be relied upon to prevent the head 57 from rotating with the nut 56.

While I have shown and described specific embodiments of my invention which are fully capable of achieving the objects and providing the advantages herein set forth, it will be understood that my invention is not to be restricted to the foregoing details of construction, except as defined in the appended claims.

I claim:

1. An adjustable end fitting for use in a mechanical actuator which comprises: a first member attached to said actuator and having a cylindrical portion with threads of a given direction on the periphery thereof; a plurality of axially directed keyways disposed in the periphery of said first member; a second member adapted to connect to the driven device and having a cylindrical portion with external threads having a direction different than the direction of said first-mentioned threads on the periphery thereof; a bore in the cylindrical portion of said second member having axially extending radial projections adapted to engage said keyways and thereby prevent relative rotation of said members, but allow axial movement therebetween; a connecting nut having a portion of its bore threaded to engage the threads of said first member and another portion of the bore threaded to engage the threads of said second member whereby, upon rotation, said nut moves axially with respect to said first member in a different direction than its axial movement with respect to said second member thus varying the relative axial positioning of said first member with respect to said second member; an annular groove disposed in the periphery of said connecting nut; an axially directed slot disposed across said annular groove; and locking means connected to said first member and having a lug disposed in said annular groove and an axial projection disposed in said slot, said locking means being axially movable for a limited distance when released, but axially immovable when locked.

2. In a mechanical actuator having a rotatably mounted nut member which is substantially immovable axially and a non-rotatable axially movable screw member which is threadedly engaged with said nut and is extended and retracted by rotation of said nut, an adjustable end fitting for adjusting the overall length of said actuator to correspond to the driven device comprising: a sleeve threadedly engaged with one end of said screw member and keyed to prevent relative rotation therebetween; a head member having an ear portion adapted to be connected to a driven device and a cylindrical portion having a bore with internal threads of a given lead therein; a threaded portion of the periphery of said sleeve member having threads similar to said first-mentioned threads, but of different lead; an adjustable nut having a bore with internal threads adapted to engage the external threads of said sleeve member and a periphery with external threads adapted to engage the internal threads in said head member bore, whereby rotation of said nut relative to said sleeve member and said head member causes said nut to move axially with respect to said sleeve member at a different rate than its axial movement with respect to said head member, thus causing a variation in the relative axial positioning of said sleeve member and head member; a plurality of keyways in said head member; a keyway in said nut capable of alignment with a selected one of said head member keyways; a plurality of keyways in said sleeve aligned with the keyways in said head member; and a key adapted to be disposed in one of the aligned keyways of said head member and sleeve and in said nut keyway to lock said head member, nut and sleeve together.

3. In a mechanical actuator having a rotatably mounted nut member which is substantially immovable axially and a non-rotatable axially movable screw member which is threadedly engaged with said nut and is extended and retracted by rotation of said nut, an adjustable end fitting for adjusting the overall length of said actuator to correspond to the driven device comprising: a first member connected to said actuator and having a portion with threads of a given direction thereon; a second member having a portion for connection to a driven device and a threaded portion having threads of a different direction; splined interlocking means between said first and second members which prevent relative rotation of said members, but allow axial movement therebetween; a connecting member having a portion threadedly engaged with the threaded portion of said first member and another portion threadedly engaged with the threaded portion of said second member, said connecting member being rotatable with respect to said first and second members whereby said first and second members are caused to move axially with respect to each other; and releasable locking means which when locked engage said connecting member and prevent rotation thereof.

References Cited in the file of this patent

UNITED STATES PATENTS

| | | |
|---|---|---|
| 598,307 | Leffler | Feb. 1, 1898 |
| 1,647,747 | Prokop | Nov. 1, 1927 |
| 2,420,364 | Espenas | May 13, 1947 |
| 2,508,482 | Stukenborg et al. | Jan. 1, 1952 |
| 2,783,809 | Haines | Mar. 5, 1957 |
| 2,813,733 | Herrmann | Nov. 19, 1957 |